United States Patent [19]

Okihara et al.

[11] Patent Number: 5,277,239
[45] Date of Patent: Jan. 11, 1994

[54] PNEUMATIC RADIAL TIRE INCLUDING AT LEAST ONE FOLDED BELT LAYER

[75] Inventors: Masakazu Okihara; Yusaku Miyazaki, both of Hiratsuka; Yoshiaki Hashimura, Isehara; Naoyuki Katsura; Zenichiro Shida, both of Hiratsuka; Tomohiko Kogure, Minami-ashigara, all of Japan

[73] Assignee: The Yokohama Rubber Co., Ltd., Tokyo, Japan

[21] Appl. No.: 963,220

[22] Filed: Oct. 19, 1992

[30] Foreign Application Priority Data

Dec. 26, 1991 [JP] Japan .................................. 3-345535

[51] Int. Cl.$^5$ ........................... B60C 9/18; B60C 9/26
[52] U.S. Cl. ................................... 152/529; 152/531; 152/533; 152/536
[58] Field of Search .................... 152/528–152/529; 531, 533, 536

[56] References Cited

U.S. PATENT DOCUMENTS

| | | | |
|---|---|---|---|
| 3,945,421 | 3/1976 | Poque et al. | 152/528 X |
| 4,050,497 | 9/1977 | Pakur et al. | 152/528 |
| 4,183,389 | 1/1980 | Grosch | 152/528 |
| 4,518,023 | 5/1985 | Yamaguchi et al. | 152/529 X |

FOREIGN PATENT DOCUMENTS 2016381 9/1979 United Kingdom ................ 152/531

Primary Examiner—Michael W. Ball
Assistant Examiner—Adrienne C. Johnstone
Attorney, Agent, or Firm—Nikaido Marmelstein Murray & Oram

[57] ABSTRACT

A pneumatic radial tire characterized in that at least two belt layers reinforced with cords of a high elastic modulus extending at an angle of 14°–33° with respect to the circumferential direction of the tire are arranged between a tread and a carcass, at least one of these belt layers being folded back at both end portions thereof toward the equator of the tire so as to wrap both end portions of any remaining belt layers, at least one reinforcing layer which is reinforced with thermally contractible organic fiber cords which extend at substantially 0° with respect to the circumferential direction of the tire being inserted inside of each of the folded portions of the at least one folded belt layer, the width of the reinforcing layers being set to 10–70% of that of each of the folded portions.

10 Claims, 2 Drawing Sheets

COMPARATIVE

COMPARATIVE

COMPARATIVE

COMPARATIVE

COMPARATIVE

– 5,277,239 –

PNEUMATIC RADIAL TIRE INCLUDING AT LEAST ONE FOLDED BELT LAYER

BACKGROUND OF THE INVENTION

This invention relates to a pneumatic radial tire having an improved high-speed durability with its weight kept reasonably small and its capability of giving a driver a good ride in the car kept excellent.

In a pneumatic radial tire, at least two belt layers are buried between a carcass and a tread so that the cords in these belt layers cross each other, for the purpose of reinforcing the tread. There are some conventional radial tires for passenger cars in which one of at least two belt layers is folded back at its both widthwise end portions toward the equator of the tire so as to prevent the separation of the belt edges when the car travels at a high speed.

However, in these days in which a higher speed travel has been demanded, a conventional radial tire having the above-described structure is no longer suitable for a ultra-high speed travel of a car unless the width of the folded portions of a belt layer is increased, or it becomes necessary to provide one or a plurality of layers of belt covers so as to extend over the whole width of the belt layers to meet the speed requirement. Indeed, such modifications improved the high-speed durability of the tire, but at the cost of increased weight of the tire and decreased comfortableness of riding in the car.

SUMMARY OF THE INVENTION

An object of the present invention is to provide a pneumatic radial tire capable of improving the high-speed durability thereof without increasing the weight thereof and sacrificing its capability of giving a driver a good ride in the car.

To achieve this object, the present invention provides a pneumatic radial tire characterized in that at least two belt layers reinforced with cords of a high elastic modulus extending at an angle of 14°–33° with respect to the circumferential direction of the tire are arranged between a tread and a carcass, at least one of these belt layers being folded back at both end portions thereof toward the equator of the tire so as to wrap both end portions of any remaining belt layers, at least one reinforcing layer which is reinforced with thermally contractible organic fiber cords which extend at substantially 0° with respect to the circumferential direction of the tire being inserted inside of each of these folded portions of the at least one folded belt layer, with width of each reinforcing layer, being set to 10–70% of that each folded portion.

Since at least one of at least two belt layers is folded back at both end portions thereof so as to wrap both end portions of any remaining belt layers with at least one reinforcing layer which is reinforced with thermally contractible organic fiber cords inserted inside each of the folded portions of the at least one folded belt layer, the separation resistance of the edge portions of the belt layers and the high-speed durability of the tire can be improved. Since the reinforcing layer is formed to a width which is 10–70% of that of each folded portion of the belt layer, and selectively inserted inside of the folded portion, an increase in the weight of the tire can be minimized, and the comfortableness of riding in the car can be maintained.

DESCRIPTION OF THE PREFERRED EMBODIMENTS

Figure 1:
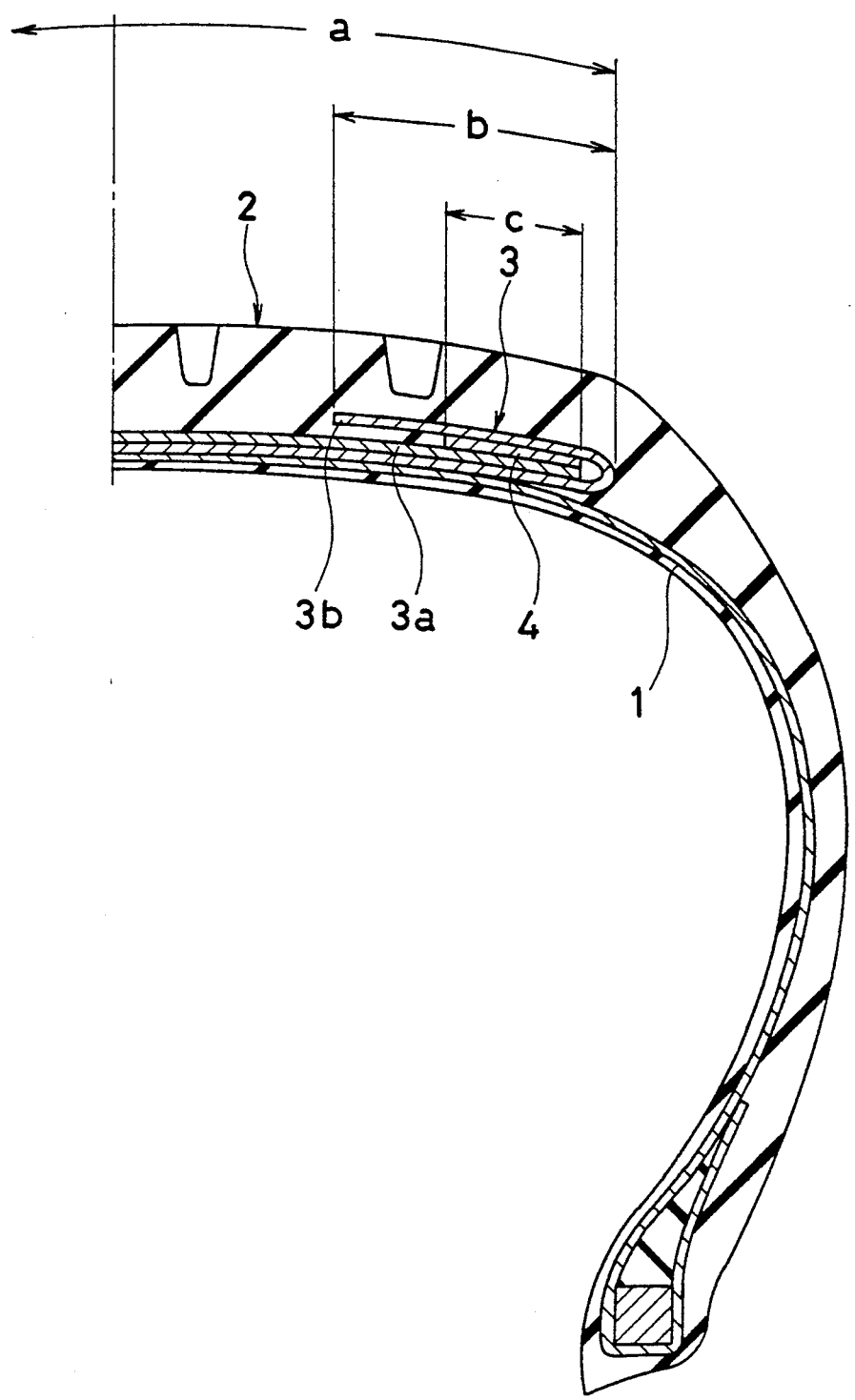
FIG. 1 is a sectional view of a half of the pneumatic radial tire according to the present invention.

Referring to FIG. 1, a tread reinforcing belt layer 3 is buried between a carcass 1 and a tread 2. This belt layer 3 comprises upper and lower belt layer members 3a, 3b which are composed of cords of a high elastic modulus, and which are laminated on each other so that the cords therein cross each other at an angle of 14°–33° with respect to the circumferential direction of the tire. In the belt layer 3 comprising at least two such belt layer members 3a, 3b, both end portions with respect to the widthwise direction of the tire of the belt layer member 3b are folded back at shoulder portions of the tread 2 toward the equator of the tire so as to wrap both end portions of the other belt layer member 3a. At least one reinforcing layer 4 reinforced with thermally contractible organic fiber cords extending at substantially 0° with respect to the circumferential direction of the tire is inserted inside of each of the two folded portions of the belt layer member 3b, i.e., between the folded portions of the belt layer member 3b and the belt layer member 3a. The width c of this reinforcing layer 4 is set to 10–70% of that b of each folded portion of the belt layer member 3b.

According to the present invention, both end portions with respect to the widthwise direction of the tire of the belt layer member 3b are folded back toward the equator of the tire, and a reinforcing layer 4 reinforced with thermally contractible organic fiber cords is inserted inside of each of these folded portions. Therefore, the separation resistance of both edge portions of the belt layer and the high-speed durability of the tire can be improved. Since the reinforcing layer 4 is thus provided, it becomes unnecessary to set the width b of the folded portions of the belt layer member 3b at a high level, and to provide the reinforcing layer at the outer side of the belt layer member 3b so that the reinforcing layer extends over the whole width of the belt layer member 3b. Accordingly, an increase in the weight of the tire and a decrease in the comfortableness of riding in the car do not occur.

According to the present invention, the belt layer member 3b is folded back onto the tread-side surface of the belt layer member 3a in the illustrated embodiment. Regarding the matter, either the upper belt layer member 3a or the lower belt layer member 3b may be folded back onto either the tread-side surface or the carcass-side surface of the other belt layer member. In view of the convenience of manufacturing tires, a belt layer member is preferably folded back onto the tread-side surface of the other.

It is preferable that the width b of each folded portion of the belt layer member 3b be 5–45% (more preferably 15–35%) of a total width a of the belt layer 3. When the width b of each folded portion is less than 5% of a total width a of the belt layer 3, a sufficiently good effect in improving the high-speed durability of the tire cannot be obtained, and, when the width b exceeds 45% of the width a, the comfortableness of riding in the car decreases and the weight of the tire increases. The total width a referred to above of the belt layer 3 is the length of an arc representing the belt layer 3 in a radial cross section of the tire, and the width b of each folded portion is the length of an arc representing a folded portion of the belt layer member 3b in the same cross section.

The cords of a high elastic modulus reinforcing the belt layer 3 comprise preferably steel cords having a tensile elastic modulus of 1800–20000 kgf/mm$^2$ or aramid fiber cords having a tensile elastic modulus of 3000–13000 kgf/mm$^2$. The tensile elastic modulus referred to above is determined in accordance with JIS L 1017.

The width c of the reinforcing layer 4 is set to 10–70%, preferably 25–50% of that b of the folded portion. When the width c of the reinforcing layer 4 is less than 10% of that b of the folded portion, a sufficient effect in improving the high-speed durability of the tire cannot be obtained, and when the width c exceeds 70% of the width b, the comfortableness of riding in the car decreases. The width c referred to above of the reinforcing layer 4 is the length of an arc representing the reinforcing layer 4 in a radial cross section of the tire. It is preferable that such reinforcing layers 4 are provided in position in which they are covered wholly with the folded portions of the belt layer member 3b so that both end portions of the remaining belt layer member 3a are substantially covered with the reinforcing layers 4.

The materials for the reinforcing layers 4 may comprise any kind of organic fiber cords as long as they have a thermal contractibility. For example, nylon fiber cords and polyester fiber cords can be used.

According to the present invention described above, at least one reinforcing layer reinforced with thermally contractible organic fiber cords extending at substantially 0° with respect to the circumferential direction of the tire is provided inside of each folded portion of the belt layer, and the width of the at least one reinforcing layer is set to 10–70% of that of each folded portion of the belt layer. Therefore, an increase in the weight of the tire can be minimized, and the high speed-durability of the tire can be improved with the comfortableness of riding in the car kept excellent.

EXAMPLE

The tires 1–3 according to the present invention, conventional tires 1 and 2 aand comparative tires 1–5 which have a size of 195/70 R14 and the following various belt structures and reinforcing structures were manufactured. The end count referred to below means the number of cords in a radial cross section of 50 mm in width of the belt layer or reinforcing layer, and the angle of cords is an angle thereof with respect to the circumferential direction of the tire.

Figure 2A:
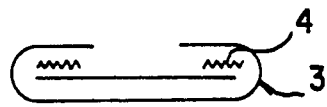
FIG. 2 is a sectioned schematic diagram showing belt structures in the tire according to the present invention.
Figure 2B:
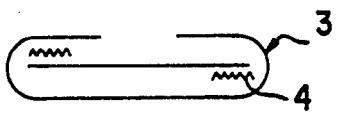
Figure 2C:
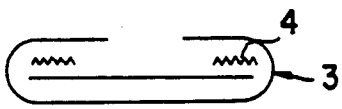
Figure 3A:
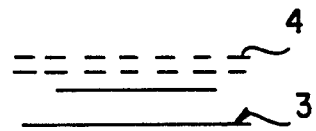
FIG. 3 is a sectioned schematic diagram showing belt structures in a conventional tire of this kind.
Figure 3B:
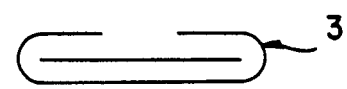
Figure 4A:
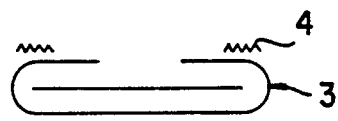
FIG. 4 is a sectioned schematic diagram showing belt structures in a comparative tire.
Figure 4B:
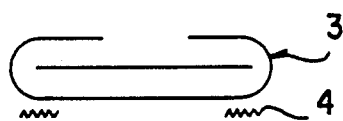

Tire 1 according to the present invention:
 Belt layer:
  Structure: As shown in FIG. 2(a)
  Material: Steel
  End count: 41
  Angle of cords: 20°
  Elastic modulus: 18000 kgf/mm$^2$
  Width b/a of folded portion: 20%
 Reinforcing layer:
  Material: Nylon
  End count: 70
  Angle of cords: 0°
  Width c/b: 33%
Tire 2 according to the present invention:
 Belt layer:
  Structure: As shown in FIG. 2(b)
  Material: Steel
  End count: 41
  Angle of cords: 20°
  Elastic modulus: 18000 kgf/mm$^2$
  Width b/a of folded portion: 20%
 Reinforcing layer:
  Material: Nylon
  End count 70
  Angle of cords: 0°
  Width c/b: 33%
Tire 3 according to the present invention:
 Belt layer:
  Structure: As shown in FIG. 2(c)
  Material Aramid (1500D/2)
  End count: 51
  Angle of cords: 20°
  Elastic modulus: 7000 kgf/mm$^2$
  Width b/a of folded portion: 20%
 Reinforcing layer:
  Material: Nylon
  End count: 70
  Angle of cords: 0°
  Width c/b: 33%
Conventional tire 1:
 Belt layer:
  Structure: As shown in FIG. 3(a)
  Material: Steel
  End count: 41
  Angle of cords: 20°
  Elastic modulus: 18000 kgf/mm$^2$
 Reinforcing layer:
  Material: Nylon
  End count: 70
  Angle of cords: 0°
Conventional tire 2:
 Belt layer:
  Structure: As shown in FIG. 3(b)
  Material: Steel
  End count: 41
  Angle of cords: 20°
  Elastic modulus: 18000 kgf/mm$^2$
  Width b/a of folded portion: 20%
Comparative tire 1:
 Belt layer
  Structure: As shown in FIG. 4(a)
  Material: Steel
  End count: 41
  Angle of cords: 20°
  Elastic modulus: 18000 kgf/mm$^2$
  Width b/a of folded portion: 20%
 Reinforcing layer:
  Material: Nylon
  End count: 70
  Angle of cords: 0°
  Width c/b: 33%
Comparative tire 2:
 Belt layer:
  Structure: As shown in FIG. 4(b)
  Material: Steel
  End count: 41
  Angle of cords: 20°
  Elastic modulus: 18000 kgf/mm$^2$
  Width b/a of folde portion: 20%
 Reinforcing layer:
  Material: Nylon End count: 70
Angle of cords: 0°
Width c/b: 33%

Figure 4C:
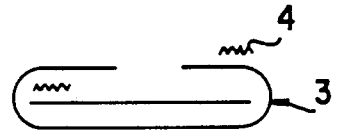

Comparative tire 3:
  Belt layer:
    Structure: As shown in FIG. 4(c)
    Material: Steel
    End count: 41
    Angle of cords: 20°
    Elastic modulus: 18000 kgf/mm²
    Width b/a of folded portion: 20%
  Reinforcing layer:
    Material: Nylon
    End count: 70
    Angle of cords: 0°
    Width c/b: 33%

Figure 4D:
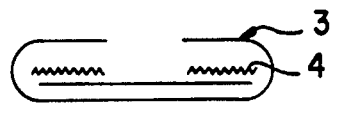

Comparative tire 4:
  Belt layer:
    Structure: As shown in FIG. 4(d)
    Material: Steel
    End count: 41
    Angle of cords: 20°
    Elastic modulus: 18000 kgf/mm²
    Width b/a of folded portion: 20%
  Reinforcing layer:
    Material: Nylon
    End count: 70
    Angle of cords: 0°
    Width of c/b: 80%

Figure 4E:
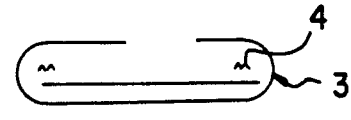

Comparative tire 5:
  Belt layer:
    Structure: As shown in FIG. 4(e)
    Material: Steel
    End count: 41
    Angle of cords: 20°
    Elastic modulus: 18000 kgf/mm²
    Width b/a of folded portion: 20%
  Reinforcing layer:
    Material: Nylon
    End count: 70
    Angle of cords: 0°
    Width c/b: 8%

These tires 1-3 according to the present invention, conventional tires 1, 2 and comparative tires 1-5 were subjected to the evaluation of high-speed durability and comfortableness of riding in the car and the measurement of the weight, in accordance with the following methods, and the results are shown in Table 1.

High-speed Durability

A tire to be tested was fitted on a rim of a size of 14×5-1/2JJ and rotated at an air pressure of 2.1 kgf/cm² with a load of 485 kg. During the test, the initial speed was set to 121 km/h, and the speed was increased by 8 km/h every 30 minutes. The speed at which failure occurred due to the separation of an edge portion of the belt layer was determined. The results are shown by indexes based on a value of 100 which represents the high-speed durability of the conventional tire 1. The large indexes represent superior high-speed durability.

Comfortableness of Riding in the Car

A tire to be tested was rotated on a drum of 1707 mm in diameter provided with a projection of 5 mm in height on the surface thereof, under the conditions including an air pressure of 2.0 kgf/cm², a load of 200 kg and a speed of 50 km/h, and it was evaluated on the basis of the difference between a maximum value and a minimum value of the longitudinal impact force occurred during the test. Excellent, good and bad tires in terms of the comfortableness of riding in the car are marked with a double circle ⊚, a single circle ○ and a cross × in Table 1.

Weight

The weight decrease from the weight of the 15 conventional tire 1 is shown in Table 1.

TABLE 1

|  | High-speed durability | Comfortableness of riding in the car | Weight (g) |
|---|---|---|---|
| Conventional tire 1 | 100 | × | Reference |
| Conventional tire 2 | 95 | ⊚ | −200 |
| Comparative tire 1 | 98 | ○ | −150 |
| Comparative tire 2 | 97 | ○ | −150 |
| Comparative tire 3 | 98 | ○ | −150 |
| Comparative tire 4 | 112 | × | −100 |
| Comparative tire 5 | 97 | ⊚ | −190 |
| Tire 1 according to the present invention | 110 | ○ | −150 |
| Tire 2 according to the present invention | 108 | ○ | −150 |
| Tire 3 according to the present invention | 112 | ⊚ | −750 |

As is clear from Table 1, all of the tires 1-3 according to the present invention are superior to the conventional tire 1 in the high-speed durability and the comfortableness of riding in the car, and the weight of the former tires could be reduced. The conventional tire 2 is inferior in the high-speed durability since it is not provided with a reinforcing layer. All of the comparative tires 1-3 are inferior in the high-speed durability since they are provided with reinforcing layers on the outer side of the folded portions of the belt layer. When the width of the reinforcing layers is set large as in the comparative tire 4, the high-speed durability is improved but the comfortableness of riding in the car decreases. When the width of the reinforcing layers is set small as in the comparative tire 5, the comfortableness of riding in the car is improved but the high-speed durability decreases.

What is claimed is:

1. A pneumatic radial tire characterized in that at least two belt layers reinforced with cords of a high elastic modulus extending at an angle of 14°-33° with respect to the circumferential direction of said tire are arranged between a tread and a carcass, at least one of these belt layers being folded back at both end portions thereof toward the equator of said tire so as to wrap both end portions of any remaining belt layers, at least one reinforcing layer which is reinforced with thermally contractible organic fiber cords which extend at substantially 0° with respect to the circumferential direction of said tire being inserted inside of each of said folded portions of said at least one folded belt layer, the width of each reinforcing layer being set to 10-70% of that of each of said folded portions.

2. A pneumatic radial tire according to claim 1, wherein said folded portions of said at least one folded belt layer are formed on the tread side of said belt layer.

3. A pneumatic radial tire according to claim 1, wherein the width of each of said folded portions of said at least one folded belt layer is set to 5-45% of a total width of said belt layer.

4. A pneumatic radial tire according to claim 1, wherein the width of each of said folded portions of said at least one folded belt layer is set to 15-35% of a total width of said belt layer.

5. A pneumatic radial tire according to claim 1, wherein said cords of a high elastic modulus reinforcing said belt layers are steel cords having a tensile elastic modulus of 18000-20000 $kgf/mm^2$.

6. A pneumatic radial tire according to claim 1, wherein said cords of a high elastic reinforcing said belt layers are aramid fiber cords having a tensile elastic modulus of 3000-13000 $kgf/mm^2$.

7. A pneumatic radial tire according to claim 1, wherein the width of each of said reinforcing layers is set to 25-50% of that of each of said folded portions of said at least one folded belt layer.

8. A pneumatic radial tire according to claim 1, wherein both non-folded end portions of any remaining belt layers are substantially covered with said reinforcing layers.

9. A pneumatic radial tire according to claim 1, wherein said thermally contractible organic fiber cords reinforcing said reinforcing layers are nylon fiber cords.

10. A pneumatic radial tire according to claim 1, wherein said thermally contractible organic fiber cords reinforcing said reinforcing layers are polyester fiber cords.

* * * * *